No. 819,610. PATENTED MAY 1, 1906.
B. SIMONS.
AUTOMATIC WEIGHING APPARATUS.
APPLICATION FILED SEPT. 26, 1898.
5 SHEETS—SHEET 1.
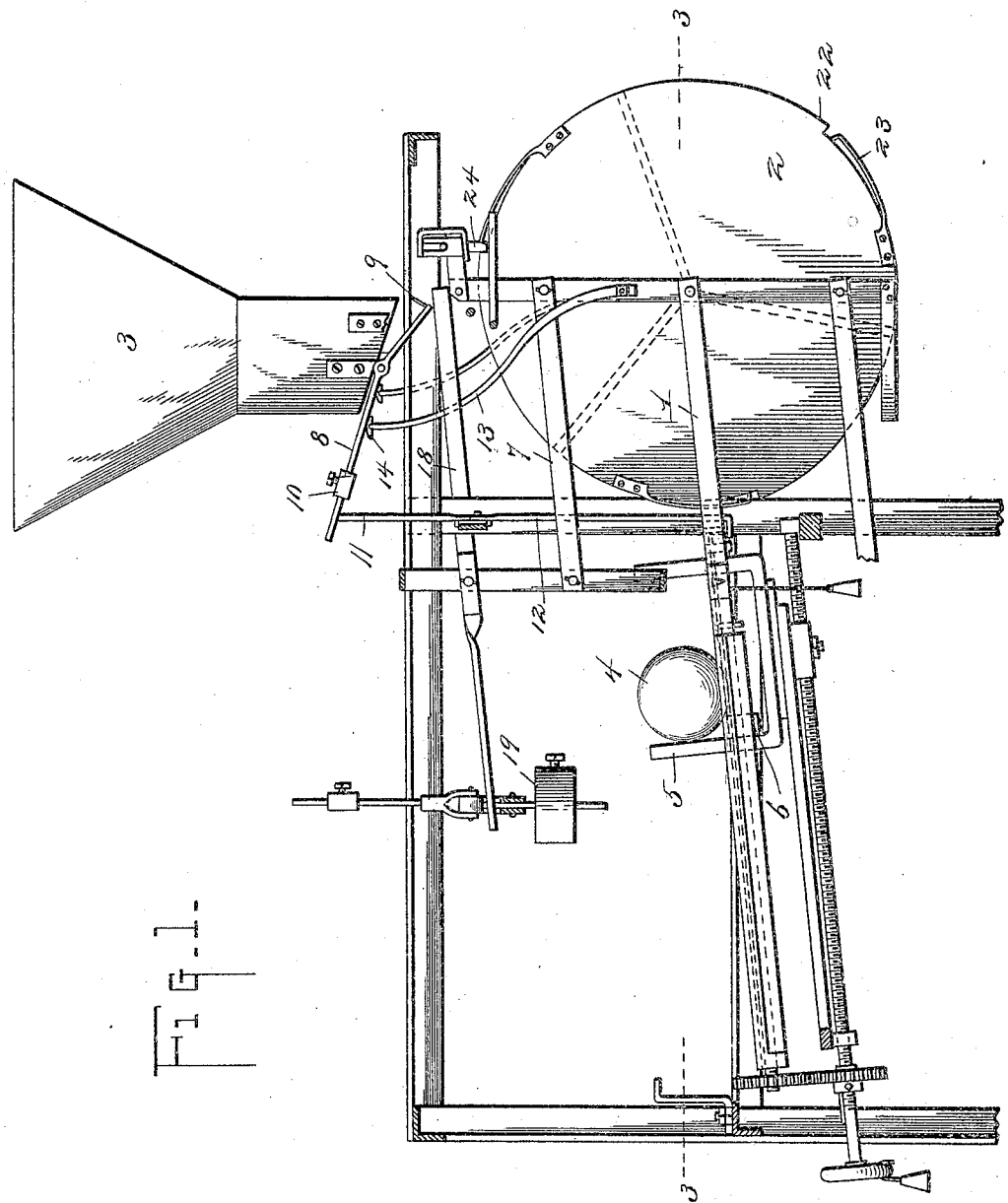
Witnesses
Harry L. Ames,
K. A. Nau
Inventor
Benjamin Simons.
By V. D. Stockbridge
his Attorney

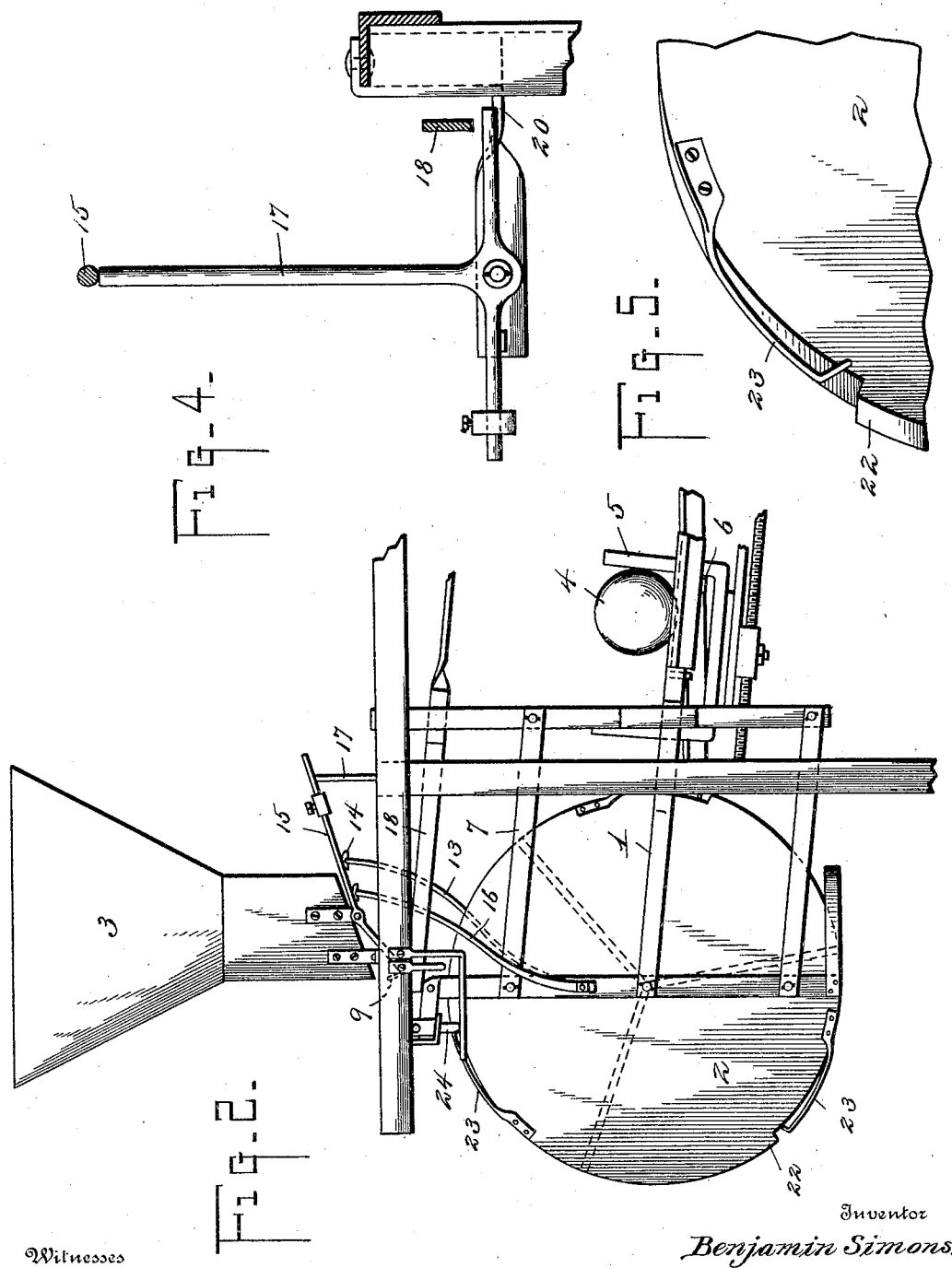

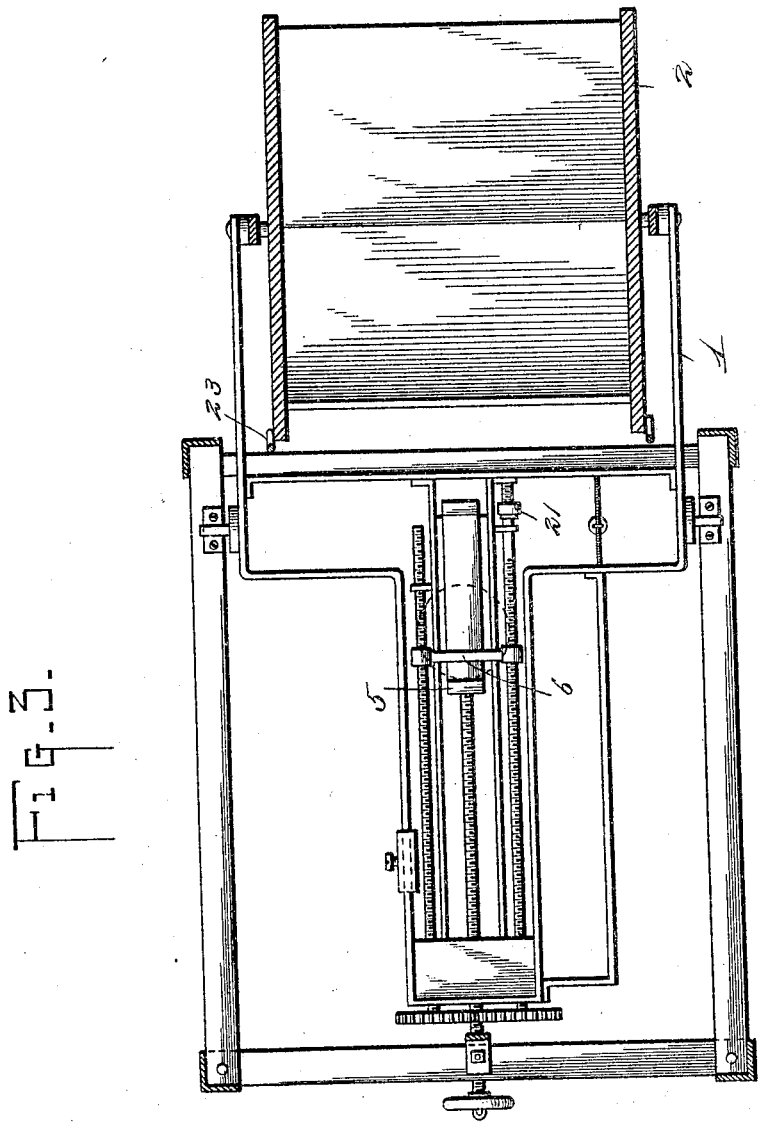

No. 819,610. PATENTED MAY 1, 1906.
B. SIMONS.
AUTOMATIC WEIGHING APPARATUS.
APPLICATION FILED SEPT. 26, 1898.
5 SHEETS—SHEET 4.
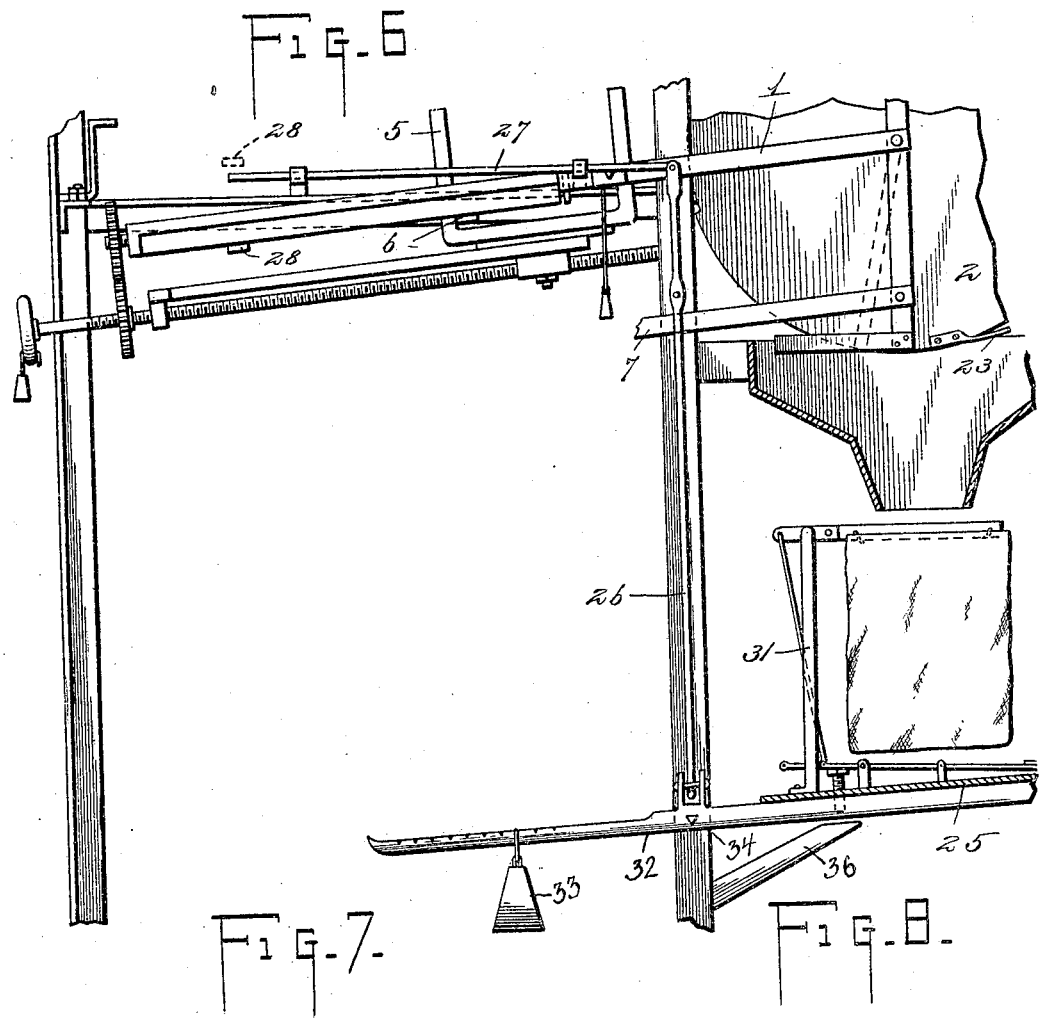
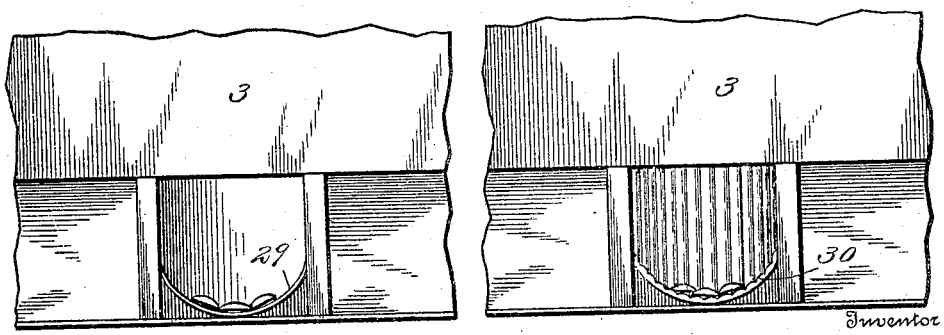
Witnesses
Harry L. Amer.
K. A. Nau
Inventor
Benjamin Simons
by V. D. Stockbridge
his Attorney.

No. 819,610. PATENTED MAY 1, 1906.
B. SIMONS.
AUTOMATIC WEIGHING APPARATUS.
APPLICATION FILED SEPT. 26, 1898.
5 SHEETS—SHEET 5.
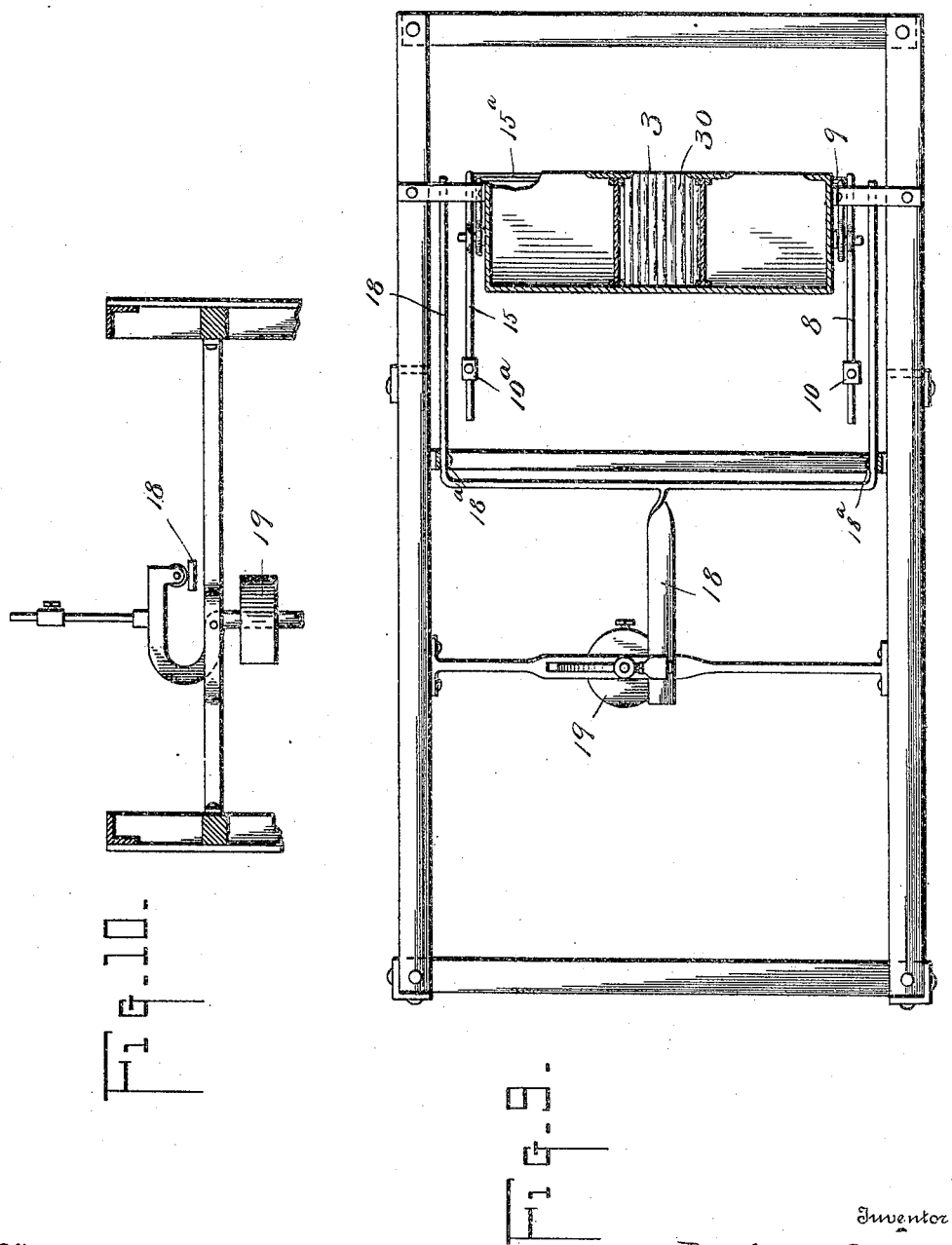
Witnesses
Harry L. Ames.
K. A. Nau.
Inventor
Benjamin Simons.
By V. D. Stockbridge.
His Attorney.

UNITED STATES PATENT OFFICE.

BENJAMIN SIMONS, OF CHARLESTON, SOUTH CAROLINA.

AUTOMATIC WEIGHING APPARATUS.

No. 819,610. Specification of Letters Patent. Patented May 1, 1906.

Application filed September 26, 1898. Serial No. 691,923.

*To all whom it may concern:*

Be it known that I, BENJAMIN SIMONS, a citizen of the United States, residing at Charleston, in the county of Charleston and State of South Carolina, have invented certain new and useful Improvements in Automatic Weighing Apparatus; and I do hereby declare the following to be a full, clear, and exact description of the invention, such as will enable others skilled in the art to which it appertains to make and use the same.

This invention relates to automatic weighing apparatus of the kind in which a rolling or traveling weight is used, and it is intended as an improvement and a carrying forward of the inventions described in my prior patents, Nos. 494,035, 564,945, and 564,946.

The object of this invention is to render the operation of the machine described in my prior patents more accurate and reliable, to provide for conveniently maintaining the trim of the scale-beam or balance-frame, to latch and hold the rotary buckets firmly in position, to provide improved means for automatically stopping the operation of the machine, and also to provide for gradually opening and closing the principal gate or cut-off.

The invention consists in certain new combinations of the instrumentalities hereinafter particularly described, and pointed out in the claims.

In the drawings forming a part of this specification, Figure 1 is a side elevation showing the parts in operative position, the side frame being removed. Fig. 2 is a broken elevation taken from the side opposite to that of Fig. 1. Fig. 3 is a horizontal section on the line 3 3 of Fig. 1, showing a plan of the scale-beam or balance-frame and its connections. Fig. 4 is an enlarged detail showing the trip-lever or latch in elevation and one side of the swinging counterbalance or floating frame in section. Fig. 5 is an enlarged detail showing the shoulder and spring-catch on the periphery of the revolving buckets. Fig. 6 is a sectional elevation showing improved means for automatically stopping the machine. Figs. 7 and 8 are elevations showing the discharge spout or chute leading laterally from a hopper. Fig. 9 is a view showing the floating frame and its immediate connections in plan and the hopper in section. Fig. 10 is a sectional detail showing the pendulous weight in elevation.

Generally speaking, the combinations and mode of operation of this machine are the same as those described in my prior patents.

1 is the scale-beam or balance-frame. 2 is the revolving bucket mounted on the outer extremity of said frame.

3 is the hopper, having a lateral discharge mouth or chute, such as described in my Patent No. 564,945.

4 is the rolling weight.

5 is the chock to receive the shock of the ball on its return.

6 is the weight-gage.

7 is one of the parallel bars for slinging the bucket.

8 is a yoke or frame carrying the central gate or primary cut-off 9 and the counterpoise-weight 10.

11 is a tripping bar or lever in the form of a bell-crank pivoted to a stationary part of the frame or support and operated to release the weighted yoke and cut-offs by means of a rod 12, provided with a hook which engages the balance frame or beam as it is depressed in the process of weighing.

13 is a bracket or standard carrying at its upper end a segmental bar or cross-head 14 in the plane of the yoke or frame 8. The bracket is connected with the balance-frame, and as the outer end of said frame rises after having discharged a load one extremity of the cross-head or segment strikes the frame 8 at a point distant from the axis of said frame and gradually, but with increasing resistance, opens the gate. The object of this construction and mode of operation is to start the gate with as little resistance as practicable when the balance-frame returns to its normal inclined position in order that the beam may rise and allow the ball to move from the fulcrum to its operative position.

15 is the yoke or primary frame for the main gate or cut-off 15ª, carrying a counterpoise-weight 10ª, and 16 is a bracket connected with the balance-frame carrying a segmental cross-head, the bracket and cross-head being similar in construction and mode of operation to the bracket 13 and 14, above described. The yoke or frame 15 is held in the position shown in Fig. 2 with the gate open by means of a trip stud or arm 17, which is pivoted to any fixed part of the frame. The trip stud or arm 17 is provided with a cross-arm, one end of which is weighted (see Fig. 4) and the other end of which is in the range of a swinging frame or weight 18, which for convenience I call a "floating" frame. It should be noted that the trip-stud is operated in both directions independently of the balance-frame. This frame 18 is pivoted to the main frame of the machine at 18ª, one end of the same bearing upon the balance-frame and the other end projecting into the range of a pendulous or variable weight 19, which serves to gradually and progressively diminish the effect of said frame. The floating frame is in the range of a shoulder or stop 20, connected with the frame, and operates to cause or contribute to the primary movement of the balance-frame to a fixed or predetermined position, after which it comes to rest upon its support 20. The floating frame 18 comes in contact with the trip-stud 17 and trips the main gate-frame 15 just before said frame reaches its position of rest. The floating frame trips the stud 17 to release the yoke 15 and permit the primary cut-off 15ª to close without any reciprocal action from said frame. It also shares in bringing the balance-frame to a horizontal position. By reason of this I am enabled to bring the balance-frame to rest at a predetermined point, whether the gate closes or is prevented from closing by clogging or otherwise, and this insures the movement of the balance-frame from a predetermined point at which it takes its final or balance load. In order to obviate the necessity of trimming the balance-frame after the movement of the chock and the weight-gage 6, as has hitherto been the case, I provide means whereby the weight-gage may be moved without disturbing the trim of the balance-frame. The means for accomplishing this end consist of parallel screw-rods geared together, as described in my previous patent, one of the screw-rods for operating the weight-gage being provided with right-and-left screw-threads, one of the threads being in advance of the pivot of the balance-frame, and connected with the screw-rod at the end referred to is a weight 21, which will be thrown forward as the ball-gage is drawn backward. As the space or range of movement of this weight 21 must be considerably less than that of the ball-gage, the threads for operating it will be much finer than those for operating the gage. In this way the variation in the balance of the balance-frame due to the movement of the ball-gage will be automatically compensated by the movement of the weight 21, and thereby the necessity for adjusting or trimming the balance-frame every time the chock and ball-gage are moved is obviated. In order that the revolving buckets may be caught and held firmly in position when stopped or brought to rest, I provide a shoulder 22 on the rim of the bucket, and attached to the rim of the bucket a spring 23, the end of which is inclined so as to make a tapering notch or socket, with which the gravity stop-pin 24 engages, the stop-pin being chamfered or tapered, as shown in the drawings. In this way the narrow end of the pin will start into the wide opening or mouth of the notch, and, dropping down the incline, will bring the buckets to an exact and firm position, so that there will be no rattling or shaking of the bucket. During a bagging process I connect with the bagging-platform 25 a vibrating arm or lever 26, carrying a sliding rod 27, supported in suitable bearings and operatively connected with the lever 26. The operation of this part of the machine is as follows: In case the bag is not removed at the proper time the platform 25 is tilted, thereby rocking arm 26 and throwing slide-rod 27 backward, so as to bring it in the range of projection 28, the projection 28 being connected with or attached to the balance-frame. In this way the balance-frame is locked or held in position and the operation of the machine is arrested. In my experiments I have found that coffee and like substances having a flat or plane surface will not flow freely and regularly along an inclined chute or spout having plane surfaces such as I use for a lateral discharge from the hopper. In order to overcome this difficulty, I provide a spout or chute with a curved or corrugated surface, as shown at 29 and 30, Figs. 7 and 8, so that the plane surface of the substance to be fed may not rest upon a corresponding plane surface. In this way I am enabled to feed coffee and like substances from a hopper having a lateral discharge-chute regularly and at a uniform rate.

31 represents a bag-holder with bag attached, of any conventional character.

The platform 25 is supported on one end of a beam 32, and a counterbalance-weight 33 is adjustably mounted on the other end of said beam, the beam being fulcrumed at an intermediate point 34 on the frame of the machine.

36 designates a stop for arresting the downward movement of the beam 32 and the platform supported thereby.

Having described my invention, what I claim as new, and desire to secure by Letters Patent, is—

1. In an automatic weighing-machine, a balance-frame, a counterweight therefor, an adjustable weight, a gage for said weight, and reversely-arranged differential screws for moving and adjusting said gage, and for operating the counterweight for the balance-frame.

2. In a weighing apparatus, the combination of a feed-hopper having a plurality of discharge-passages, a balance-frame, a main gate or cut-off, a secondary gate, and an adjustable weight for operating said cut-off in one direction only whereby the main gate may be given a variable force for closing without affecting the primary descent of the balance-frame, substantially as described.

3. An automatic weighing-machine comprising a hopper with a plurality of openings and having a plurality of gates for closing the same, a balance-frame, means not coupled with the balance-frame for closing the primary gate consisting of a floating frame and a tripping lever or bar, whereby no frictional resistance is transmitted to the balance-frame during the closing of the main gate, substantially as described.

4. An automatic weighing-machine comprising a balance-frame, an automatic rolling weight, a ball or weight gage for said weight, reversely-arranged differential screws for moving and adjusting said gage and for simultaneously operating a counterweight for maintaining the trim of the balance-frame, substantially as described.

5. In automatic weighing-machines having rotary buckets, the combination with the bucket-wheels, of stop-shoulders on the peripheries of the wheels, and spring-catches arranged to pass by the sides of the bucket and each formed to provide a tapering notch or socket between it and the opposite stop-shoulder, and a stop-pin adapted to fit in said socket, substantially as described.

6. In automatic weighing-machines, the combination of a scale-beam having an arm and carrying a platform, a balance-frame, and stop mechanism consisting of a pivoted lever coupled with the arm on the beam, a sliding rod, and a projection on the balance-frame, whereby the operation of the machine is automatically arrested, substantially as described.

7. In automatic weighing-machines, the combination of a feed-hopper having a plurality of openings, a balance-frame, a primary or main cut-off, and a drip or final cut-off for closing the openings, and means disconnected from the balance-frame for holding the main gate open as the scale-beam is depressed, substantially as described.

8. In automatic weighing-machines having a hopper with a passage from the same, the combination with said hopper of a main cut-off, a secondary gate, and means not coupled with the balance-frame to close the main cut-off by extra or variable weight without affecting the travel of the scale-beam, substantially as described.

9. In automatic scales, a floating frame normally resting on the balance-frame and means for rendering the primary cut-off and the floating frame separate from each other, before the cut-off is closed or the floating frame comes to rest, substantially as described.

10. An automatic weighing-machine comprising a main frame, a feed-hopper with passages therefrom, a main or primary gate for closing certain of said passages, a valve-arm, means attached to the main frame for holding the primary gate open, whereby the weight of the valve-arm is not sustained by the scale-beam and whereby the effect of the friction of the valve on the movement of the scale-beam is eliminated during the primary descent of the scale-beam, and a floating frame for tripping said holding means, substantially as described.

In testimony whereof I affix my signature in presence of two witnesses.

BENJAMIN SIMONS.

Witnesses:
   Wm. L. Ford,
   V. D. Stockbridge.